Figure 1:
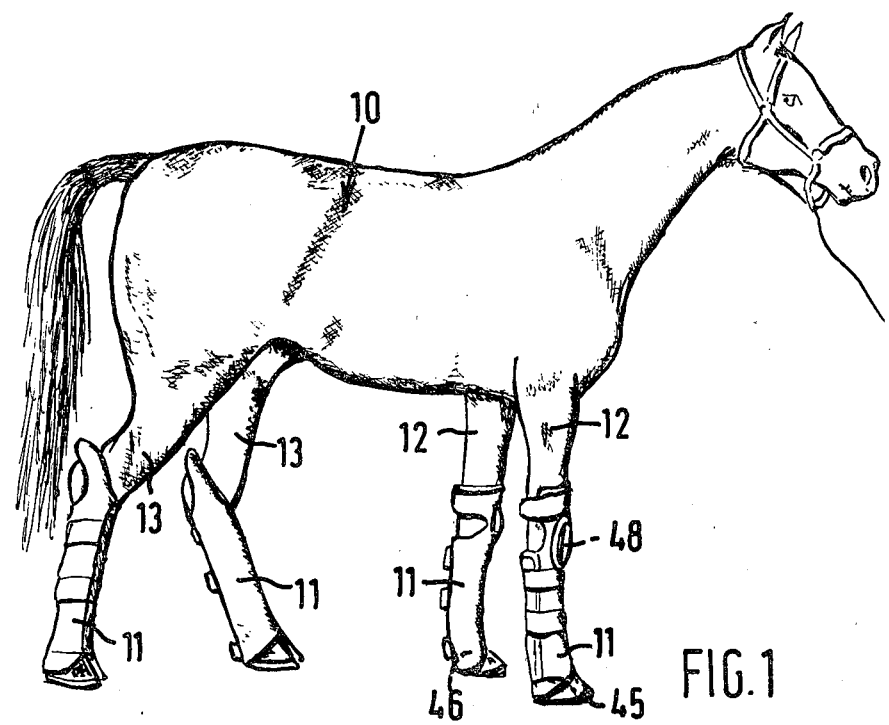

United States Patent [19]

Pellew

[11] 4,342,185
[45] Aug. 3, 1982

[54] PROTECTIVE GARMENT FOR THE LEGS OF A QUADRUPED OF THE HORSE GENUS AND MATERIAL FOR SUCH GARMENT

[76] Inventor: Peter I. Pellew, 9, Shafto, Mews, London S.W.1, England

[21] Appl. No.: 210,666

[22] Filed: Nov. 26, 1980

[30] Foreign Application Priority Data

Nov. 27, 1979 [GB] United Kingdom ............... 79 40906

[51] Int. Cl.³ .......................... A61D 3/00; A61F 5/00
[52] U.S. Cl. ..................................... 54/82; 128/80 R
[58] Field of Search .................... 119/126, 127; 54/82; 128/80 R, 82, 83, 87 R, 89 R, 165

[56] References Cited

U.S. PATENT DOCUMENTS

| | | | |
|---|---|---|---|
| 2,512,925 | 6/1950 | Eggeman | 54/82 |
| 3,193,984 | 7/1965 | Schubert | 54/82 |
| 3,209,517 | 10/1965 | Hyman | 54/82 |
| 3,439,670 | 4/1969 | Schuerch | 128/80 R |
| 3,473,527 | 10/1969 | Spiro | 128/80 R |
| 3,913,302 | 10/1975 | Centers | 54/82 X |
| 4,140,116 | 2/1979 | Hampicke | 54/82 X |

FOREIGN PATENT DOCUMENTS

| | | |
|---|---|---|
| 1928505 | 12/1969 | Fed. Rep. of Germany . |
| 2034045 | 1/1972 | Fed. Rep. of Germany . |
| 214875 | 5/1924 | United Kingdom ..................... 54/82 |
| 1524021 | 9/1978 | United Kingdom . |
| 1581026 | 12/1980 | United Kingdom . |

Primary Examiner—Gene Mancene
Assistant Examiner—Robert P. Swiatek
Attorney, Agent, or Firm—Fleit & Jacobson

[57] ABSTRACT

A one-piece protective garment for horse's legs comprises a flat, flexible pad foldable to encircle the legs and securable in position e.g. by "Velcro" straps on one side edge of the pad co-operating with "Velcro" strips at the other side edge. The pad consists of an outer layer of nylon-reinforced PVC, a central layer of foam and an inner layer of imitation fur. Extra thickness knee and hock portions are provided on the garment. The bottom edge of the pad is split to form a flap that covers the coronary band but flares over the hoof. The fleshy bulbs of the heels are covered.

11 Claims, 3 Drawing Figures

PROTECTIVE GARMENT FOR THE LEGS OF A QUADRUPED OF THE HORSE GENUS AND MATERIAL FOR SUCH GARMENT

This invention concerns a protective garment for the legs of a quadruped of the horse genus. The genus includes horses, donkeys, mules etc, and although the invention extends to the whole of the genus, it will hereafter be particularly described with reference to the use of the garment for protecting legs of a horse. In another aspect, the invention also concerns a material for such a garment.

It is well-known that when horses are transported be it by road or wall, or even on later, their legs are very vulnerable to injury due to sudden acceleration or deceleration motions or sudden changes of direction. More particularly, when horses are transported by road, injuries frequently occur when the motor vehicle stops suddenly or brakes hard, whereupon the horse can damage its front knees; similarly, when the vehicle is swerving or cornering violently, in its efforts to keep its balance the horse will tread sideways and one leg may damage the bulbs (the fleshy outside part) of the heel of the other leg or may step on and injure the coronary band, which is the name for the sensitive part where the hoof joins the fleshy part of the leg; or again, on sudden acceleration the horse's hocks may be injured.

While this problem has been recognised, attempts to overcome it have not been satisfactory. Hitherto, known leg-protecting garments for horses have consisted of a large number of discrete articles such as knee caps, hock boots, bandages, overreach boots and gamgee.

The fitting of these garments had to be done sequentially and took a very great deal of time, even up to 20 minutes for the four legs of the horse. Moreover, if these garments were applied incompetently e.g. by overtightening the bandages, the horse's legs could be damaged by constricting the circulation or by causing friction sores, or sores due to inadequate drying of wet limbs. Also, these known garments could not always be washed and maintained in a satisfactory manner.

The present invention seeks to eliminate the above-mentioned disadvantages of known protective garments for the legs of a quadruped of the horse genus and to provide an improved protective garment, preferably a one-piece garment, which provides a very high level of protection for the hock, knee cap, cannon and shannon bones, fetlock, pastern, coronary band, heels, bulbs and hoof walls of a horse's leg, which can be fitted speedily, e.g. in one or two minutes, which can be secured in a manner not requiring extra skill, which guarantees freedom of flexing movement of the leg joints, which is made from a material which is comfortable to the animal, which allows air to circulate between the garment and the limbs of the animal, which is resistant to chemical or mechanical damage and which is easily maintained by being completely washable.

According to one aspect of the present invention, there is provided a protective garment for the leg of a quadruped of the horse genus, comprising a flat, flexible pad having a top edge, side edges and a bottom, fastening means on said pad for securing it about the legs of the quadruped, said pad further including a reinforced, thicker portion for protecting the knee or hock of the quadruped, the pad being dimensioned such that its top edge extends above the knee or hock while its bottom edge extends to the hoof and the heel of the leg, and a split and flared flap provided at said bottom edge.

According to another aspect of this invention there is provided a protective garment for protecting the legs of a quadruped, the garment being in the form of flexible, flat pad foldable into a generally cylindrical shape to encircle a leg of the quadruped, said pad including an outer layer made from a tough, water-impermeable material, a core of non-absorbent foam material of high impact resistance and an inner layer destined to engage the leg of the animal and made of real or imitation fur, said outer layer, core and inner layer being united together.

The outer layer may be of canvas but preferably is of a synthetic material most preferably a fine nylon netting which has been coated with polyvinyl-chloride. The inner layer is preferably imitation (synthetic) sheepskin.

The preferred form of fastening is a band extending from one side edge of the pad co-operable with a strip on the opposite side edge, the band and strip being made from "Velcro" (Trade Mark) i.e. a material comprising interpenetrating, randomly arranged fabric hooks, although other fastenings may also be used such as buckles, and press-studs.

The said flap is so shaped that the coronary band on the leg is completely encircled and the hoof is partially protected.

In the case of a garment for the rear leg of the horse, the garment is dimensioned to extend above the hock but without there being any fastening in that area so as not to rub or interfere with the flexure of the hock joint.

The reinforced portion of the pad for the knee and the hock may have a double or triple thickness of said core.

When the garment is to be made for the front legs of horses it is provided with four fasteners while the garment for the rear legs is provided with three fasteners.

In a preferred embodiment the front leg protecting garment is generally rectangular but one side edge portion is cut away to form a recess extending from that side edge to about the longitudinal central line of the garment; the reinforced knee portion is adjacent to this recess. Preferably, the rear leg protecting garment has a main, generally rectangular portion and, integrally therewith, an extension portion which extends from the top edge of the main portion and which is of reduced width, the extension portion carrying centrally the reinforced hock portion and having a projecting side flap.

Figure 2:
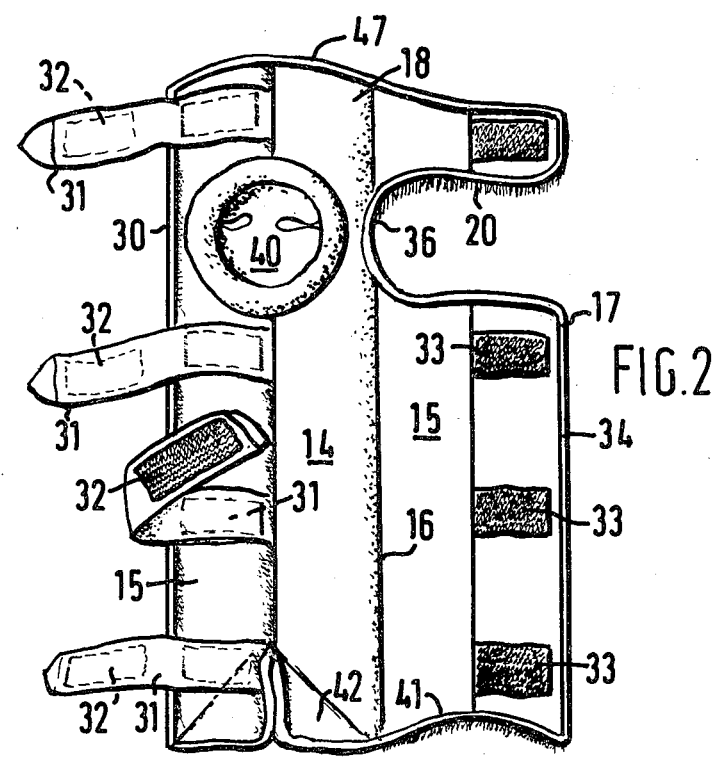
Figure 3:
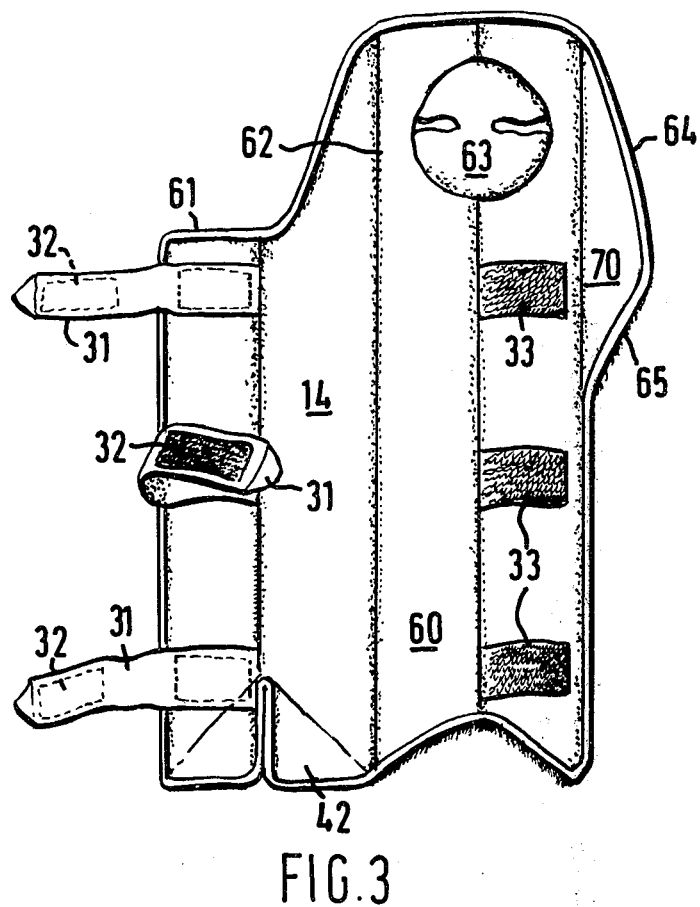

The invention will be described merely by way of example, with reference to the accompanying schematic drawings illustrating a preferred embodiment, wherein:

FIG. 1 is a side view of a horse wearing the protective garment according to the invention, FIG. 2 is a developed plan view of a front leg protecting garment, and FIG. 3 is a developed view of a rear leg protecting garment.

Expressions such as "top", "bottom" and "side" throughout this specification and claims refer to the relevant directions or orientations shown in the drawings.

Referring first to FIG. 1, there is shown a horse 10 provided on each of its legs with a protective garment according to the invention.

The garments 11 on the front legs 12 of the horse 10 are mirror-symmetrical and accordingly only the garment 11 for the front right leg will be described with special reference to FIG. 2. Similarly, the garments 11 on the back or rear legs 13 of the horse 10 are mirror-symmetrical and accordingly only the garment 11 for the back right leg will be described with special reference to FIG. 3.

Each garment 11 is in the form of a flexible pad 14 of generally rectangular shape foldable into a generally cylindrical shape to encircle a leg 12. The pad 14 is a multilayer laminate and comprises a plurality of juxta-posed rectangular panels 15 connected together e.g. by stitching and/or welding. The seams are designated by 16. The edges 17 are reinforced stitched fabric tapes.

The pad 14 has an outer layer 18 made from a fine nylon mesh or netting to which a polyvinyl-chloride layer has been applied. This layer 18 is thus very tough, resists cracks, tears and rips (so that if such tears or cuts occur, they will not readily propagate), is water-impermeable and resists fading or staining. Moreover, in the range of temperatures it is anticipated to subject the garment, the layer 18 will not be affected by temperature variations and will be dimensionally stable. Most importantly, the flexibility of the layer 18 ensures the limb movements of the quadruped are not hindered. Furthermore, the finish of the layer being smooth, it will tend to deflect blows from e.g. another hoof or leg.

The core or central layer (not shown) bonded to the outer layer is a non-absorbent synthetic foam, e.g. a polyurethane foam, of high impact, of the "breathable" type.

The inner layer 20 is a furry material, preferably a synthetic fur imitating sheepskin and is bonded to the core and outer layer 18. The furry layer 20 thus provides the well-known comfort or "feel" of fur, it is a good heat insulator yet permits air circulation to promote drying of perspiration or wetness due to rain, mist etc.

Turning now to FIG. 2, the garment 11 for the front legs 12 comprises a pad 14 of generally rectangular shape. One side edge 30 is provided with our approximately equi-spaced fastening straps 31, the underside of each of which being provided with a "Velcro" (Trade Mark) tape 32. The tape 32 is co-operable with and securable to strips 33 of "Velcro" sewn at corresponding locations adjacent the opposite side edge 34 when the garment is folded about the legs of the horse.

That same side edge is provided with a generally U-shaped arcuate recess 36 extending to about the centre of the pad 14, between the uppermost strip 33 and the adjacent strip 33. Level with the recess 36 the pad 14 is provided with a reinforced knee protector 40 of triple foam core thickness sewn on the pad 14. The bottom edge 41 of the pad 14 has an inverted V-shaped flap 42 produced by a slit and oblique stitching. The flap 42 in use covers the hoof 45 of the horse's leg. This not only prevents the garment from riding up during use, but also protects the sensitive area of the animal's coronary band. The rest of the bottom edge 41 encircles the heel of the horse to protect the bulb portion 46.

As may be seen from FIG. 1 the garment 11 for the front legs 12 extends at its top edge 47 to above the knee 48.

The garment 11 for the rear legs 13 shown in FIG. 3 is essentially similar: the construction of the pad 14, the provision of the flap 42 and the nature of the fastening straps 31 and co-operating strips 33 are identical. Hence hereafter only the differences will be described.

The shape of the top of the pad 14 is different. It may be said to have a generally rectangular main portion 60 that terminates at transverse edge 61 and an integrally connected extension portion 62 which is about ¾ the width of the main portion 60. In the centre of the extension portion 62 is a reinforcement 63, similar to the reinforcement described above, but unlike the latter, the reinforcement 63 is of double thickness only.

The garment of FIG. 3 has three co-operating straps and strips which means that (see FIG. 1) the hock of rear legs of the horse are completely free in flexure.

The side edge 64 of the extension portion 62 has an outwardly flaring shape which goes over into an oppositely flaring part of the side edge 65 of the main pad portion 60, whereby to form a side flap 70 which protects the part of the horse's rear leg immediately below the hock.

It will be appreciated that the preferred embodiment of the invention provides a one-piece protective garment for the legs of the horse genus which will prevent, or at least greatly reduce the risk of, injury to all the sensitive parts of the legs, which is easy and quick to apply while being difficult to over-tighten, which is hygienic and comfortable, which is easy to store when not in use, lightweight and which can be readily washed, even machine-washed.

The garment may be made in a variety of sizes to suit the animal, e.g. pony-size, cob-size and full-size. The weight of the material may also be readily varied.

|  | Horse | Cob | Pony |
|---|---|---|---|
| Front Legs |  |  |  |
| Length in cm. | 69.0 | 57.0 | 49.5 |
| Width in cm (max) | 40.0 | 36.0 | 30.0 |
| Width of each panel in cm. | 10.0 | 9.0 | 7.5 |
| Rear Legs |  |  |  |
| Length in cm. | 74.0 | 63.5 | 51.0 |
| Width in cm (max) | 40.0 | 36.0 | 30.0 |
| Width of each panel in cm. | 10.0 | 9.0 | 7.5 |
| Diameter of knee pad |  |  |  |
| Front leg (max.) | 15.0 | 14.0 | 12.7 |
| Rear leg (max.) | 10.0 | 9.0 | 9.0 |
| Length of split (front & rear) in pad | 9.0 | 5.0 | 5.0 |

What is claimed is:

1. A protective garment for the front legs of a quadruped of the horse genus, comprising a flat, generally rectangular, flexible pad foldable into a generally cylindrical shape to encircle a leg of the quadruped and having a top edge, side edges and a bottom, fastening means on said pad for securing it about the legs of the quadruped, said pad further including a reinforced, thicker portion for protecting the knee or hock of the quadruped, the pad being dimensioned such that its top edge extends above the knee or hock while its bottom edge extends to the hoof and the heel of the leg, a split and flared flap provided at said bottom edge, one side edge portion being cut away to form a recess extending from that side edge to about the longitudinal central line of the garment, and the reinforced knee portion being adjacent to this recess.

2. A protective garment for the rear legs of a quadruped of the horse genus, comprising a flat, flexible pad foldable into a generally cylindrical shape to encircle a leg of the quadruped and having a top edge, side edges and a bottom forming a generally rectangular main portion, fastening means on said pad for securing it about the legs of the quadruped, said pad further including a reinforced, thicker portion for protecting the knee or hock of the quadruped, the pad being dimensioned such that its top edge extends above the knee or hock while its bottom edge extends to the hoof and the heel of the leg, a split and flared flap being provided at said bottom edge, an extension portion extending from the top edge of the main portion and of reduced width, the extension portion carrying centrally the reinforced hock portion and having a projecting side flap.

3. A protective garment according to claim 1 or 2 wherein said pad includes an outer layer made from a tough water-impermeable material, a core of non-absorbent foam material of high impact resistance and an inner layer designed to engage the leg of the animal and made of real or imitation fur, said outer layer, core and inner layer being united together.

4. A garment according to claim 3, wherein the outer layer is of canvas.

5. A garment according to claim 3 wherein the outer layer is of nylon netting or mesh which has been coated with polyvinyl-chloride.

6. A garment according to claim 3, wherein the inner layer is a furry material, e.g. imitation (synthetic) sheepskin.

7. A garment according to claim 3, wherein the reinforced portion of the pad for the knee or the hock has a triple or double thickness respectively, of said core.

8. A garment according to claim 2, wherein the garment is dimensioned to extend above the hock but without there being any fastening means in that area so as not to rub or interfere with the flexure of the hock joint.

9. A garment according to claim 1, wherein fastening means includes a plurality of bands each extending from one side edge of the pad and co-operable with one of a plurality of strips on the opposite side edge, the bands and strips being made from "Velcro".

10. A garment according to claim 1, wherein the said flap is so shaped and dimensioned that in use the coronary band on the leg is completely encircled and the hoof is partially protected.

11. A garment according to claim 1, wherein the garment is a one piece garment.

* * * * *